United States Patent [19]

Bosund et al.

[11] 3,924,005

[45] Dec. 2, 1975

[54] SOLUBLE PROTEIN

[75] Inventors: Sven Ingmar Walton Bosund, Halsingborg; Bengt Lennart Bengtsson, Bjuv, both of Sweden

[73] Assignee: Societe d'Assistance Technique pour Produits Nestle S.A., Lausanne, Canada

[22] Filed: May 21, 1973

[21] Appl. No.: 362,358

[30] Foreign Application Priority Data

May 22, 1972 United Kingdom............... 23934/72

[52] U.S. Cl. .................... 426/7; 426/657; 426/590
[51] Int. Cl.² ............................................. A23J 1/04
[58] Field of Search ......... 426/7, 9, 56, 61, 63, 148, 426/212, 376, 364, 190; 195/28

[56] References Cited
UNITED STATES PATENTS

| | | | |
|---|---|---|---|
| 3,293,140 | 12/1966 | Henry | 426/56 X |
| 3,697,285 | 10/1972 | Faith, Jr. et al. | 426/7 |
| 3,798,126 | 3/1974 | Gasser et al. | 426/364 X |

*Primary Examiner*—A. Louis Monacell
*Assistant Examiner*—R. A. Yoncoskie
*Attorney, Agent, or Firm*—Watson, Leavenworth Kelton & Taggart

[57] ABSTRACT

A process is described for preparing a fish protein isolate containing less than 0.5% by weight of lipids and which is water-soluble at all pH values, in which a slurry comprising comminuted fish material is subjected to enzymatic treatment until less than 20% by weight of the protein present in the fish is precipitable at a pH of 4.5, undegraded proteins are then precipitated from the slurry and insoluble matter is separated from the slurry to provide a solution of fish protein isolate.

7 Claims, No Drawings

SOLUBLE PROTEIN

The present invention is concerned with a process for the preparation of a fish protein isolate having a bland flavour and which is water-soluble at all pH values.

In order to obtain a bland and stable fish protein isolate or concentrate, it is generally necessary either to remove the fish lipids from the proteins or to stabilise them with antioxidants. It is generally accepted that removal of fish lipids has to be quite extensive, down to less than 0.5% in dry matter, and is normally carried out by solvent extraction using an alcohol such as ethanol, isopropanol, butanol or other solvents, including acetone, ethyl acetate, ethylene dichloride or hexane, or mixtures of two or more of these solvents. The solvent extraction is basically a delicate operation requiring special equipment and skilled labour. Furthermore, if no processing other than drying is applied, the end-product is essentially insoluble in water.

Much work has been directed towards elimination of the extraction step, but up to the present no completely satisfactory method has been devised. On the other hand, addition of relatively large amounts of antioxidants for stabilisation of the fat only partly inhibits flavour reversion.

An object of the present invention is to provide a process for preparing a fish protein isolate, containing less than 0.5% by weight of lipids, which does not involve extraction of fish lipids with a solvent.

Another object of the invention is to provide a fish protein isolate containing at least 90% protein which is soluble in water at all pH values.

The present invention provides a process for preparing a fish protein isolate containing less than 0.5% by weight of lipids and which is water-soluble at all pH values, in which a slurry comprising comminuted fish material is subjected to enzymatic treatment until less than 20% by weight of the protein present in the fish is precipitable at pH 4.5, undegraded proteins are then precipitated from the slurry and insoluble matter is separated from the slurry to provide a solution of fish protein isolate.

In carrying out the process, the fish material may be first ground, for example in a meat grinder and then further subdivided in a homogeniser, generally without addition of water as most raw fish materials have a dry matter content rarely higher than about 25% by weight. The comminuted material will normally be obtained as a homogeneous solution, and various known methods exist for achieving this end.

The primary object of the enzymatic treatment step is to solubilise the proteins, without unnecessary degradation, in order to free lipo-proteins and lipids and secure good functional properties in the final protein isolate.

If the starting material is whole raw fish, the enzyme needed for solubilisation is usually present in the viscera. During grinding and homogenisation, the natural enzymes are thoroughly mixed with the flesh and the enzymatic degradation will start immediately. The temperature is preferably maintained between 40° and 70°C in order to obtain rapid dissolution. Depending on the type of fish used, the dissolution time will normally be in the range 15 minutes to 24 hours. If the activity of the natural enzymes is inadequate, various commercially available enzymes active in the pH range of 5.0 to 10.0 may be added.

When eviscerated fish or filleting wastes are used, any commercially available proteolytic enzymes may be added, and it is preferable to use an enzyme active at alkaline pH values, e.g., 8 to 10, because at these pH values, a substantial part of the proteins will be solubilised by alkali added for pH adjustment, and the solubilised proteins will then be more easily attacked by the enzymes, allowing for a rapid solubilisation process. The amount of enzyme to be added generally varies from 0.1 to 10 g per kg of fish dry matter, depending on its activity. The dissolution time is also related to the activity of the enzyme, but will usually be in the range 15 minutes to 24 hours.

The dissolution rate is very rapid at the beginning of the enzyme treatment, slowing down with time because of an inhibitory effect of the dissolved proteins on the enzymes. When 80 to 90% of the proteins have been dissolved the reaction is completely stopped. It is possible to follow the dissolution rate by the following simple test. A graduated test tube is filled to a determined level with the protein solution, concentrated acid is added to bring the pH to 4.5 and the tube is centrifuged for one minute. The amount of solids settled at the bottom of the tube is a direct measure of the amount of undissolved protein. The enzyme treatment is continued until the amount of precipitated protein is less than 20% by weight of the total protein present.

When the enzyme treatment has reached the desired degree of protein solubilisation, the undegraded proteins are precipitated from the slurry. The undegraded proteins also include lipo-proteins. The precipitation may conveniently be effected by adjusting the pH of the reaction mixture to a value in the range 4.0 to 5.0, for example by addition of an acid. Any acid of food quality may be used, but it is especially preferred to use hydrochloric acid as it may be easily removed during subsequent steps of the process. Alternatively, the undegraded proteins may also be precipitated by heating the slurry to a temperature above 70°C, preferably to a temperature of 80° to 90°C. The residence time for the precipitation has been found to vary with the temperature; in practice, times of about 10 minutes at 90°C, or around 30 minutes at 80°C, have given very satisfactory precipitation. The precipitation is an important step in the process, because the precipitated protein absorbs the lipo-proteins and the lipids so that a stable isolate is obtained. About 10 to 20% of the fish protein is generally also precipitated in this step.

The precipitate is then removed, together with undissolved material, by any convenient mechanical procedure. For example, separation may be carried out using vibrating screens, centrifuges or filters. After the separation, a clear protein solution containing 10 to 15% by weight of protein is obtained, and the yield represents 80 to 90% of the fish protein raw material. The separated fraction containing bones, solid proteins, lipo-proteins and lipids may be dried or further fractionated by selective centrifuges according to particle size and specific gravity. The various fractions are by-products and may be further treated by known methods.

The protein solution is preferably concentrated, for example by ultrafiltration or by thermal evaporation. Ultrafiltration is the preferred method as besides concentration some desalting and elimination of flavour and odour compounds is obtained. The protein solution may thus be concentrated from 10 to 15% respectively to 30 to 40%. If a thermal evaporator is used, the solution may be concentrated up to about 65% dry weight.

The concentrated protein solution has a pH value between 4 and 5 and is stable enough to allow transportation over large distances for final processing. Stability of the solution may, if required, be increased by addition of preservatives which are removed in a subsequent purification step.

If the protein solution contains residual fish flavour or odour it may be deodorised before drying. Various known deodorisation methods are available, including steam-stripping and treatment with active carbon or other adsorbents such as "XAD resin" (Rohm & Haas). Chemicals for deodorisation may also be used, for example hydrogen peroxide which is very effective for oxidising various flavour components and bleaching pigments. Drying of the solution, optionally after concentration, may be carried out by conventional methods, spray-drying being preferred.

The resulting protein isolate is low in lipids (below 0.5% on dry weight) and the ash content is in the range 2 to 10% by weight. The protein content is between 90 and 98% by weight and its molecular weight is essentially between 5,000 and 50,000. The protein is of high nutritional value, at least equal and generally better than casein. The protein is 100% water-soluble at all pH values. A 3% by weight solution in water is clear and slightly yellow in colour. The protein is bland in flavour and can be used for enrichment of a wide range of food products. By virtue of its solubility, it is especially suitable for protein enrichment of acidic beverages, which may be carbonated.

The following examples are given by way of illustration only. The percentages are by weight.

EXAMPLE 1

1000 kg of cod filleting wastes are ground in a meat grinder and then further comminuted in a homogeniser. Sodium hydroxide is added to the resulting slurry to give a pH value of 9.0, and 2 kg of a bacterial protease are added and the mixture is heated to 50°C and maintained with stirring for two hours. Hydrochloric acid is then added to a pH value of 4.5 and the slurry is continuously heated to 90°C in a tube heat exchanger. After a holding time of two minutes the solution is cooled to 30°C and the bones are removed on a vibrating screen. The free fat and the precipitated proteins and lipo-proteins are separated from the dissolved proteins in a centrifuge. The clear protein solution is then concentrated by ultrafiltration from 12 to 30% dry matter.

The concentrated protein solution is deodorised by steam-stripping in a column, where it is contacted for 15 minutes countercurrent to steam at 100°C. 0.5 kg of steam are supplied per kg of solution. The deodorised solution is then concentrated in an evaporator to 65% dry matter and spray-dried.

The spray-dried powder is slightly yellow in colour and bland in flavour. The lipid content is 0.4% and the ash content 8.6%. The balance of 91% is protein of good nutritional value. The PER value is 3.1 compared to 3.0 for casein determined simultaneously.

EXAMPLE 2

1000 kg of whole anchoveta are ground in a meat grinder and then further comminuted in a homogeniser. The homogenised fish mass is heated to 60°C and maintained at this temperature with stirring for 4 hours. A centrifugal test analysis as described above showed that 4 hours' reaction time was sufficient to reach a dissolution of about 85% of the proteins. The resulting slurry is then acidified to pH 4.5 with phosphoric acid and the solution is passed through a heat exchanger where it is heated to 90°C for two minutes to inactivate all enzymes. It is then cooled to 70°C, insoluble matter is removed in a centrifuge and the solution is passed through a filter in order to remove traces of undissolved proteins, lipo-proteins and free fat. The clear solution, still at 70°C is deodorised by passage through a column of XAD-2 resin (Rohm & Haas), which removes all flavour and colour components. The solution is then concentrated by evaporation to 65% dry matter and spray-dried. The dry material, which is completely soluble at all pH values, has the following composition:

| | |
|---|---|
| Protein | 97.0 % |
| Lipids | 0.2 |
| Ash | 2.8 |

EXAMPLE 3

The protein isolate prepared as described in Example 1 is used for the preparation of an acidic beverage. 3.5 kg of the protein are dry-blended with 6.0 kg of sucrose, 0.3 kg of a mixture of citric, malic, phosphoric and ascorbic acids, 0.1 kg of lemon flavour and 0.1 kg of colouring. The blend is granulated, with addition of 10% water, on an inclined pan granulator and dried to a moisture content of 2%. The granulated product is easily wettable and soluble in water, 100 g of the dried beverage powder are reconstituted with 900 g of water to provide a beverage containing above 3% protein, which approximates to the protein content of milk.

EXAMPLE 4

25 kg of resin-deodorised protein solution (10% protein) obtained as described in Example 2 are combined with 25 kg of frozen orange juice concentrate and 50 kg of water. The mixture is pasteurised for 10 seconds at 90°C, cooled to 5°C and bottled. The beverage has a pH of 4.0 and is stable for at least 4 weeks at 5°C. Its flavour is rated by a trained panel of tasters as very similar to regular orange juice.

EXAMPLE 5

1000 kg of cod heads are ground in a meat grinder and then further comminuted in a homogeniser. Two kg of a bacterial protease are added and the mixture is heated to 50°C and maintained with stirring for four hours. The mixture is then heated to 90°C for 10 minutes to inactivate the enzyme and to precipitate the undegraded protein and the fat. The mixture is cooled to 30°C and coarse particles such as bones are removed on a vibrating screen. The free fat, the precipitated undegraded proteins and lipo-proteins are separated from the dissolved proteins in a centrifuge. The clear protein solution is then concentrated by ultrafiltration from 12 to 30% dry matter.

The concentrated protein solution is deodorized by steam-stripping in a column, where it is contacted for 15 minutes counter-current to steam at 100°C. 0.5 kg of steam are supplied per kg of solution. The deodorised solution is then concentrated in an evaporator to 65% dry matter and spray-dried.

The spray-dried powder is slightly yellow in colour and bland in flavour. The lipid content is 0.4% and the ash content 4.6%. The balance of 95% is protein of good nutritional value. The PER value is 3.1 compared to 3.0 for casein determined simultaneously.

EXAMPLE 6

1000 kg of red fish filleting wastes are ground in a meat grinder and then further comminuted in a homogeniser. Ammonium hydroxide is added to give a pH value of 9.5 and 0.5 kg of trypsin is added, the mixture is heated to 40°C and maintained at this temperature with stirring for two hours.

The mixture is then heated to 80°C for 30 minutes to inactivate the enzyme and to precipitate the undegraded protein and the fat. The free fat, the precipitated proteins, the lipo-proteins and the bones are separated from the dissolved proteins in a decanting centrifuge. The clear protein solution is then contacted for 5 minutes counter-current to vacuum steam at 70°C in order to remove ammonia and flavour components. 0.2 kg of steam are supplied per kg of solution. The deodorized solution is then concentrated in an evaporator to 50% dry matter and spray-dried. The isolate has a bland flavour and contains 94% protein.

What we claim is:

1. A process for preparing a fish protein isolate containing less than 0.5% by weight of lipids and which is water-soluble at all pH values comprising subjecting an aqueous slurry of comminuted fish material to enzymatic solubilization until less than 20% but greater than 0% by weight of the protein of said fish material is precipitatable at a pH of 4.5, precipitating undegraded proteins from the slurry by a step selected from the group consisting of acidifying said slurry to a pH of 4.0 to 5.0 and heating said slurry to a temperature above 70°C and separating the precipitated insoluble matter comprising undegraded proteins, lipo-proteins and lipids from the slurry to provide a solution of fish protein isolate.

2. A process according to claim 1 in which the fish material comprises raw whole fish and the enzymatic treatment is effected with enzymes present in the fish.

3. A process according to claim 1 in which the enzymatic treatment is effected at a temperature of 40° to 70°C.

4. A process according to claim 1 in which the undegraded proteins are precipitated by acidifying the slurry to a pH of 4.0 to 5.0.

5. A process according to claim 1 in which the undegraded proteins are precipitated by heating the slurry to a temperature above 70°C.

6. A process according to claim 5 in which the slurry is heated at a temperature of about 90°C for about 10 minutes.

7. A process according to claim 5 in which the slurry is heated at a temperature of about 80°C for about 30 minutes.

* * * * *